United States Patent [19]

Graf et al.

[11] Patent Number: 4,541,453
[45] Date of Patent: Sep. 17, 1985

[54] HIGH TEMPERATURE SLIDE VALVE

[75] Inventors: Harlan G. Graf; Harry R. Janssen; Don L. Edwards; Don D. Duren, all of Ponca City, Okla.

[73] Assignee: Conoco Inc., Ponca City, Okla.

[21] Appl. No.: 548,464

[22] Filed: Nov. 3, 1983

[51] Int. Cl.[4] .................. F16K 3/30; F16L 59/00
[52] U.S. Cl. .................... 137/315; 137/334; 137/375; 251/327; 251/328; 251/329
[58] Field of Search ............... 137/240, 315, 375, 334; 251/326, 327, 328, 329

[56] References Cited

U.S. PATENT DOCUMENTS

| | | | |
|---|---|---|---|
| 1,727,161 | 9/1929 | Dupius | 251/327 |
| 3,013,770 | 12/1961 | Anderson et al. | 251/329 |
| 3,027,135 | 3/1962 | Kellar | 251/329 |
| 3,463,193 | 8/1969 | Yost | 251/327 |
| 3,701,359 | 10/1972 | Worley et al. | 251/326 |
| 3,726,306 | 4/1973 | Purvis | 251/329 |
| 3,976,094 | 8/1976 | Jandrasi et al. | 137/240 |
| 4,252,299 | 2/1981 | LoBue | 137/240 |

Primary Examiner—George L. Walton
Attorney, Agent, or Firm—Richard W. Collins

[57] ABSTRACT

A slide valve for use in a high temperature gas line is described. The valve is constructed to allow field assembly and disassembly for ease of service, and has insulating means and gas purge means for maintaining the exterior of the valve housing at a low temperature. The valve includes a slide plate which can be provided with a flow opening in either a first location such that the slide plate is in tension when the valve is closed while hot or in a second location such that the slide plate is in tension when the valve is opened while hot.

5 Claims, 5 Drawing Figures

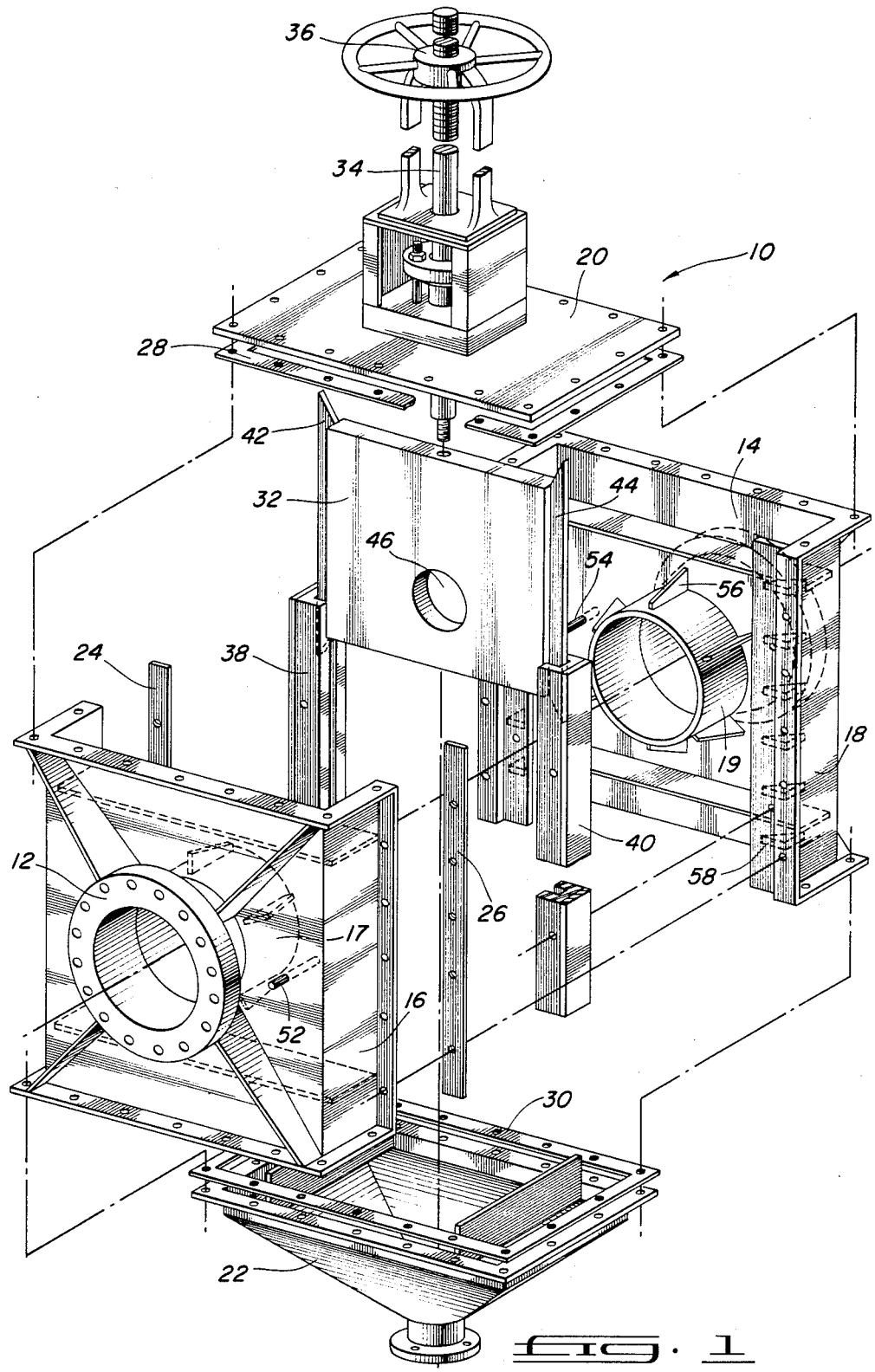

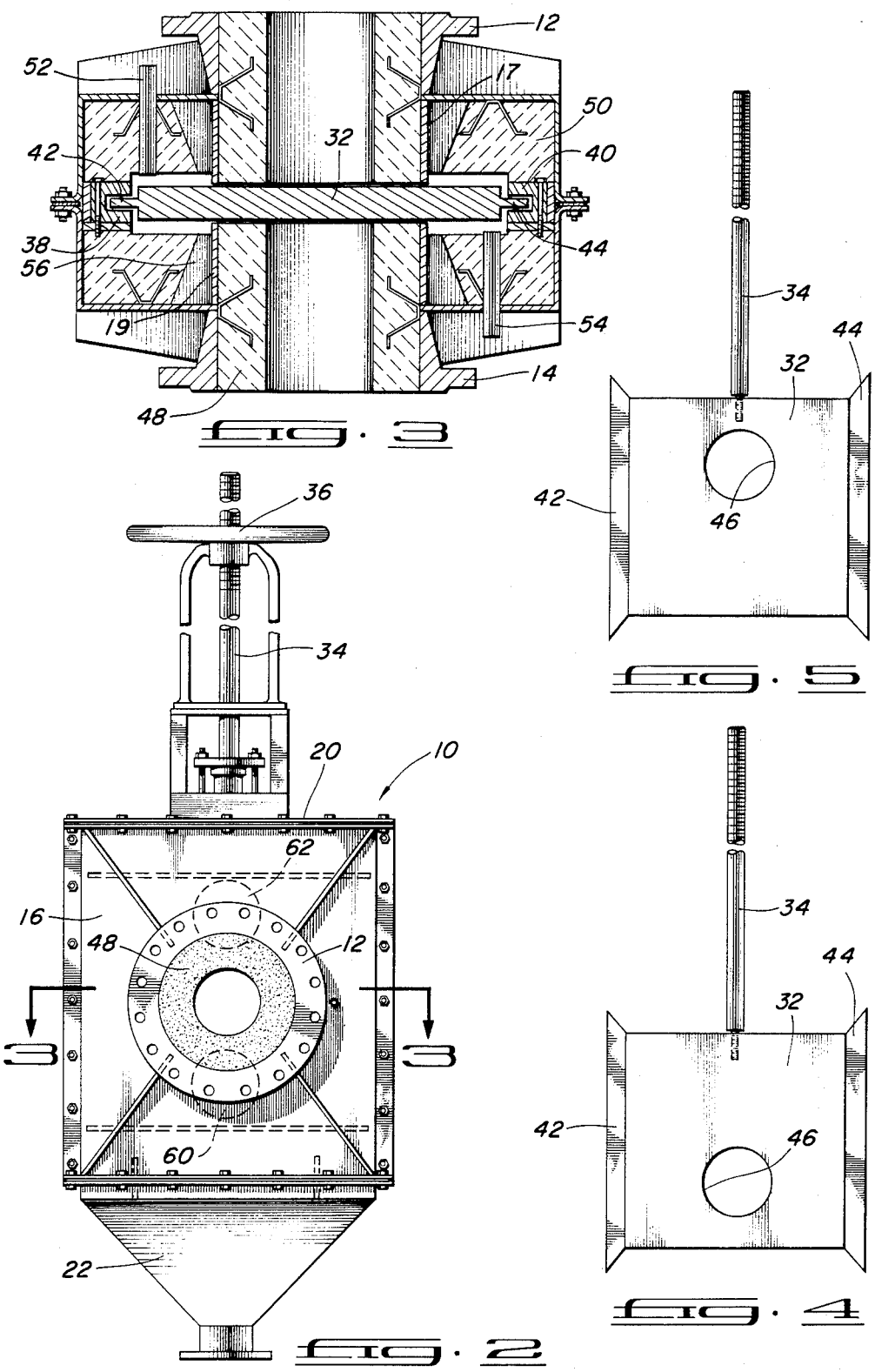

HIGH TEMPERATURE SLIDE VALVE

BACKGROUND OF THE INVENTION

1. Field of the Invention

This invention relates to valves for use in high temperature gas service, and more particularly to slide valves for use in low pressure and high temperature gas flow applications.

2. The Prior Art

There are many industrial operations which involve transfer of large volumes of low pressure gas at high temperature. The use of butterfly type valves is common in such service, and is satisfactory to varying degrees. However, butterfly valves are subject to rather high leakage rates, such as 5 to 15 percent.

Slide valves have been used in various industrial applications, but have usually been less than satisfactory for various reasons.

A slide valve having a slide plate with an opening therethrough is disclosed in U.S. Pat. No. 688,725.

There has been a continuing need for a slide valve which can be used in high temperature gas service and which is easily serviced in the field. Such a valve is provided by this invention.

SUMMARY OF THE INVENTION

According to the present invention, a slide valve is provided which is easily assembled and disassembled in the field and which can be used in high temperature gas service without the need for exotic materials of construction. This is accomplished by constructing the valve in separable sections, providing insulation on selected surfaces in the valve, and providing gas purge means in a manner to effect cooling of the internal parts of the valve.

THE DRAWINGS

FIG. 1 is an exploded isometric view of a slide valve according to the invention.

FIG. 2 is a front elevation of the slide valve.

FIG. 3 is a cross section taken along the line 3—3 of FIG. 2.

FIGS. 4 and 5 are front elevations of variants of a slide for use in the slide valve.

DESCRIPTION OF THE PREFERRED EMBODIMENT

The preferred slide valve in accordance with this invention is used to direct hot gas streams from a heater or kiln to other process equipment for startup of certain operations, or to switch hot gas streams from one item of equipment to another or to reverse the flow direction of such streams.

The valve is designed for ease of fabrication, maintenance, and operation, and preferably is arranged so that slide movement in the high temperature mode places the slide in tension rather than compression.

Tight gas shut-off in high temperature service, such as 650° C., is difficult to obtain. Butterfly valves typically leak from 5 to 15 percent when used in such service, and slide valves have been generally unsatisfactory in such service when constructed of conventional materials.

The valve described herein provides good shut-off, is easy to assemble and maintain, and does not require exotic materials of construction. The valve is particularly suited for use with a vertical coke calcining kiln. One of the slide valves is used in the heated gas line during startup and another in the gas draw during kiln operation. After startup, the valve in the heated gas startup line is closed while hot, and in the gas draw operation the other slide valve is opened while hot. In both cases, the slide is in tension when operated while hot, as will be discussed in more detail below.

As shown in FIG. 1, a slide valve 10 includes connecting members shown as a pair of flange members 12 and 14 mounted in split housing members 16 and 18 respectively. Inner cylindrical members 17 and 19 coextensive with the inner diameter of flange members 12 and 14 are provided. A top closure member 20 and a bottom collector hopper 22 complete the exterior housing of the slide valve. Suitable gaskets 24, 26, 28, and 30 provide a sealed housing.

A slide plate 32 is connected to valve stem 34 and is actuated by manual slide plate moving means 36. Motor actuated opening and closing means could obviously be utilized in place of the illustrated manual means. A pair of slide plate guides 38 and 40 attached to split housing member 18 include slots for key strips 42 and 44 attached to slide plate 32. An opening 46 in slide plate 32 is provided.

In FIGS. 2 and 3, insulating material 48, preferably castable refractory insulating material, is provided inside flange members 12 and 14 are cylindrical members 17 and 19, providing a sliding fit against the slide plate. Additional insulating material 50 is provided on the interior of split housing members 16 and 18. Purge gas inlets 52 and 54 (FIG. 3) extend through split housing members 16 and 18 and insulation 50.

FIGS. 1 and 3 show gussets 56 and 58 which provide rigidity to the structure.

As mentioned previously, it is desirable that the slide plate 32 be moved in tension, or pulled, when it is hot, rather than being moved in compression, or pushed. In applications where the valve is moved in one direction while it is hot and in the other direction while it is not hot, such as in a kiln start-up, this is accomplished by placing the opening 46 in slide plate 32 in either the position illustrated in FIG. 4 or FIG. 5, depending on the particular operation.

If the valve is initially closed, and is to be opened while hot, the configuration of FIG. 4 is used. In the closed position, opening 46 would be in position 60 of FIG. 2, and when the valve is opened, opening 46 would then be in alignment with the axis of flange 12.

If the valve is initially open, and is to be closed while hot, the configuration of FIG. 5 is used. In the open position, the opening 46 of slide plate 32 is initially aligned with the axis of flange 12, and when the valve is closed, opening 46 moves to position 62 of FIG. 2.

Thus, in both cases the slide plate 32 is placed in tension during movement while hot.

The valve is not necessarily limited to movement in a single direction while hot, but it is a feature of the valve that in those applications where the valve is normally moved in only one direction while hot, it can be arranged, by suitably locating the opening 46 in slide plate 32, such that the slide plate is in tension when moved while hot.

The foregoing detailed description of the preferred embodiment is intended to be illustrative rather than limiting, and numerous variations and modifications will be apparent. For example, the bottom collector hopper could be replaced with a simple bottom plate in cases where dust collection is not a factor, and the connecting flange members could be any suitable connecting members.

We claim:

1. A slide valve for use in a high temperature gas line for controlling hot gas flow comprising:
   (a) a pair of connecting members for connecting the valve to a high temperature gas line;
   (b) a housing comprising a pair of split housing members, one of said split housing members being attached to each of said connecting members;
   (c) a pair of slide plate guides connected to one of said split housing members;
   (d) a slide plate having a valve stem attached thereto, said slide plate having an opening therethrough and being slideable along said slide plate guides;
   (e) inner cylindrical members coextensive with the inner diameter of said connecting members and extending to a sliding fit against said slide member;
   (f) a first insulating means covering the inner surfaces of said connecting members and said cylindrical members and extending to a sliding fit against said slide member, said first insulation means being in direct contact with the controlled gas flow through said slide valve;
   (g) a second insulating means covering the inner surfaces of said split housing members and also covering the outer surfaces of said cylindrical members;
   (h) gas purge means extending into said housing to effect cooling of the internal ports of said slide valve; and
   (i) slide plate moving means for moving said slide plate from a first position to a second position.

2. The slide valve of claim 1 wherein each of said split housing members includes gas purge means.

3. The said valve of claim 2 wherein said opening in said slide plate moves from a position in axial alignment with said gas line when tension is applied to said valve stem.

4. The slide valve of claim 2 wherein said opening in said slide plate moves to a position in axial alignment with said gas line when tension is applied to said valve stem.

5. The slide valve of claim 1 wherein said housing includes a bottom dust collecting hopper.

* * * * *